H. A. INMAN.
BOX MAKING MACHINE.
APPLICATION FILED JUNE 13, 1913.

1,118,863.

Patented Nov. 24, 1914.
7 SHEETS—SHEET 7.

Witnesses
T. L. Morrishu
B. M. Kent

Inventor
Harry A. Inman

By Foster Freeman Watson Hort
Attorneys

UNITED STATES PATENT OFFICE.

HARRY A. INMAN, OF AMSTERDAM, NEW YORK, ASSIGNOR TO INMAN MANUFACTURING COMPANY, INCORPORATED, OF AMSTERDAM, NEW YORK, A CORPORATION OF NEW YORK.

BOX-MAKING MACHINE.

1,118,863.   Specification of Letters Patent.   Patented Nov. 24, 1914.

Original application filed June 24, 1910, Serial No. 568,740. Divided and this application filed June 13, 1913. Serial No. 773,478.

*To all whom it may concern:*

Be it known that I, HARRY A. INMAN, a citizen of the United States, and resident of Amsterdam, in the county of Montgomery and State of New York, have invented certain new and useful Improvements in Box-Making Machines, of which the following is a specification.

This invention relates to machines for making boxes of paper or like material.

One of the objects of this invention is to construct a machine which will take the material from the roll and form it into a completed box.

Another object is to construct the machine so that it may be adjusted to boxes of different sizes.

Another object is to construct a machine that will be simple in construction and operation, and so arranged that all parts will be accessible for adjustment and repairs.

Another object is to construct and arrange the elements or component parts so that they can be easily adjusted.

Another object is to improve and simplify the machine as to details.

Further objects will appear from the detailed description.

The present invention relates more specifically to the pasting and folding or forming mechanism and this application is a division of my prior application 568,740 filed June 24, 1910 and which has matured into Patent 1,067,253.

This invention will be described in connection with the accompanying drawings, in which—

Figure 10:
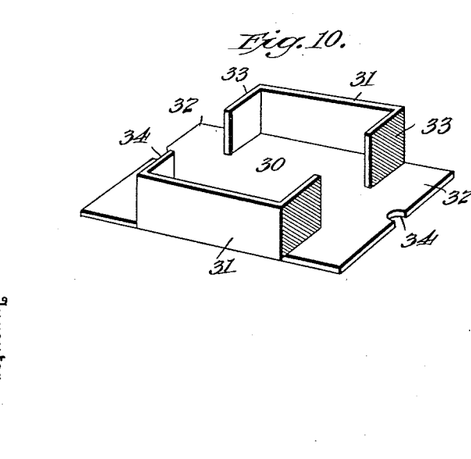
Fig. 10 is a perspective view of the box partly assembled.
Figure 11:
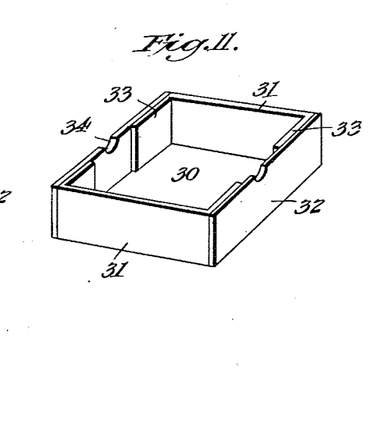
Fig. 11 is a perspective view of the assembled box.

Referring to Figs. 10 and 11 the box comprises a body member 30 having side flaps 31, end flaps 32 and corner flaps 33. The end flaps are provided with the usual finger holds or recesses 34.

The machine, generally speaking, comprises scoring mechanism A, cross scoring mechanism A', dieing mechanism B, B', pasting mechanism C, cutoff mechanism D, forming mechanism E and presser mechanism F. The web of material is drawn from a roll through suitable tension devices by means of feeding rolls G. An auxiliary pair of feeding rolls G' are also provided to feed the material through the machine. The roll support and the feeding rolls G are of substantially the same construction as shown in patent to Inman #657,418, September 4, 1900.

Figure 3:
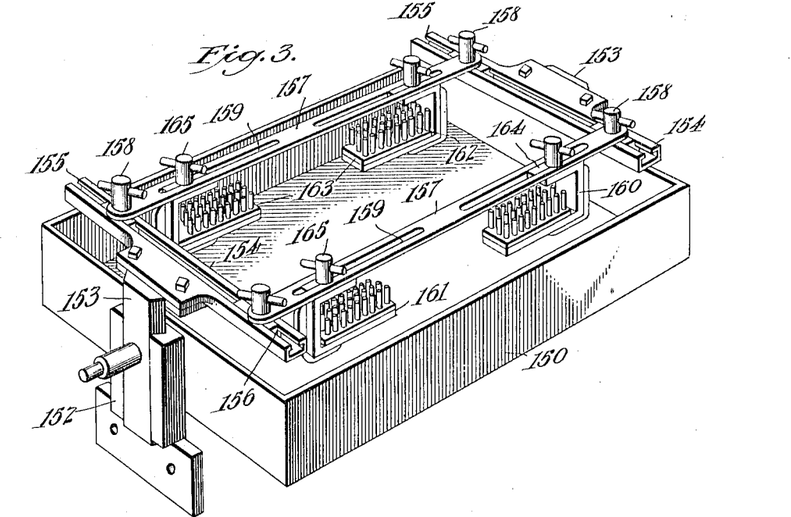
Fig. 3 is a perspective view of the pasting mechanism.

*The pasting mechanism.*—A paste receptacle 150 is supported on the side members 35 by means of vertical posts 151. The side members 35 have bolted thereto brackets 152 provided with dove-tailed slideways in which move a pair of slides 153. These slides have bolted or otherwise secured thereto heads 154 which extend longitudinally of the machine and form a carrier for the pasting mechanism. The heads 154 have formed therein T-shaped slots or slideways 155. Blocks 156 move in these slideways and have secured thereto cross bars or members 157, the connection being made by means of clamps 158. These cross bars are provided with slots 159 and support the pasting members 160. The pasting members have formed thereon horizontally arranged arms 161 which support the pasting devices 162. These pasting devices comprise pins secured to plates 163, and these plates are secured to the arms 161 by means of screws so that they may be readily detached for cleaning or for repairs. The pasting members have formed thereon ribs 164 which engage the slots 159, and clamps 165 engage the pasting members to lock them in adjusted position on the cross bars 157.

A two armed lever 166 is pivoted upon a bracket 167 upon the side member 35, and is operatively connected to the head 60 by means of a link 168. The other arm of the lever is connected to a trunnion 170 on the slide 153, the lever being provided with a slot 170$^a$ in order to permit free movement. In order that the vertical movement of the carrier may be adjusted the connection between the link 168 and the lever 166 is a pin and slot connection 169, the lower end of the link 168 being arranged to be clamped in adjusted position in the slot. The operative connection is duplicated on opposite sides of the machine.

The pasters are normally in their lowest position and dip into the paste in the receptacle 150. The head 60 is reciprocated by means of the eccentrics 62 and rods 64, the eccentrics being mounted on shafts 49 and 63. When the head 60 moves downwardly the carrier is moved upwardly to cause the pasting members to engage the flaps. The pasting members may be adjusted longitudinally of the machine by moving the cross bars 157 in the slideways 155, and they may be clamped in adjusted position by means of the clamps 158. Similarly the pasting members may be adjusted crosswise of the machine by moving them in the slots 159, and they may be clamped in adjusted position by means of the clamps 165. If desired 154 and 157 may be provided with scales. It will, therefore, be seen that this invention provides a construction in which the elements of the pasting members may be adjusted longitudinally and crosswise of the machine to adjust the pasting mechanism to boxes of different sizes. Similarly an adjustment longitudinally of the machine and relatively to the other mechanisms may also be obtained. It will be noted that the clamping members 158 and 165 are located above the web of material and above the paste receptacle so that these members will not be covered with paste, the entire construction providing a simple and accessible adjusting means.

*The feeding mechanism.*—A pair of feeding rolls 175 and 176 are mounted in brackets secured to the side members 35. These rolls are arranged to be adjusted by means of adjusting screws 177. The upper roll shaft 178 has mounted upon it a sprocket 179 which is driven by a chain 180 from a sprocket wheel 181 secured to the shaft of the step by step feeding mechanism 48. A suitable tensioning sprocket 182 may be provided to regulate the tension of the chain. The rolls 175 and 176 are geared together by means of suitable gears 183.

It will be seen that by means of the above construction the feeding mechanisms G and G' are driven in unison. The sprockets 179 and 181 are preferably so proportioned that the peripheral speed of the feed rolls 175 and 176 is slightly greater than that of the rolls 46. By means of this construction the web between the feeding mechanisms G and G' will be maintained taut. The same result may of course be accomplished by making the feed rolls of G' of slightly greater diameter than the feed rolls of G, the main object being to drive the feeding mechanisms in such a manner that the web between them will be maintained taut.

Figure 4:
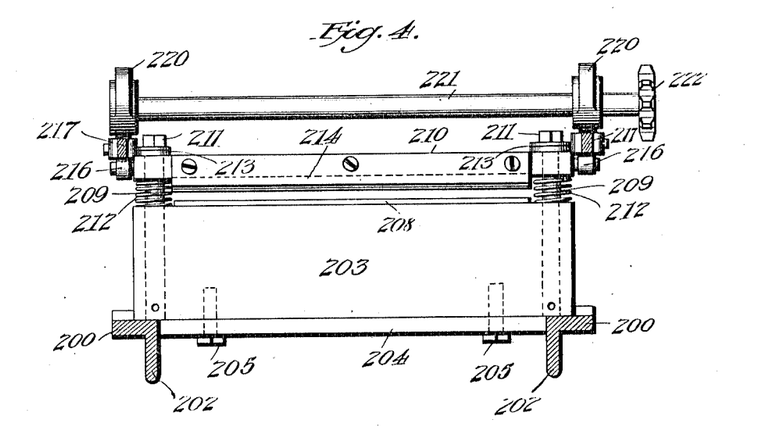
Fig. 4 is a front elevation of the cut-off mechanism, parts of the mechanism and machine frame being shown in section.

*The cutoff mechanism.*—A bed 200 is supported upon the side members 35. This bed has an angular upright portion 201 and is braced by means of ribs 202 extending along the bed and the portion 201. A base 203 is supported on the bed 200 and guided by means of a gib 204 secured to the base by means of bolts 205. Adjusting screws 206 are arranged to adjust the bed 203 toward and from the upright portion 201 longitudinally of the machine. These adjusting screws are arranged to be locked in adjusted position by means of lock nuts 207. The base has mounted thereon vertical posts 209 which are arranged to guide a knife carrier 210. The posts are provided with heads 211 which limit the upward movement of the knife carrier, and springs 212 are mounted on these posts and interposed between the base and the knife carrier. Leather washers 213 are interposed between the heads 211 and the carrier, so as to deaden the shock due to the upward movement of the knife carrier under the impulse of the springs 212. The knife carrier is provided with a knife 214 which coöperates with a die 208 on the base. The base and the die are inclined as shown, so as to permit the web of material to pass over the same. The knife carrier has secured thereto additional braces or guides 215 which aid to brace and guide the carrier in its movements. The knife carrier also has secured thereto anti-friction rolls 216, which engage the lower faces of arms 217 pivoted at 218 to the side members 240. The arms 217 have mounted thereon cam rolls 219 which are engaged by cams 220 upon a shaft 221. This shaft is mounted between rearwardly extending arms 225 of the side members 240, and has mounted upon it a sprocket 222 which is driven from the sprocket 226 on a shaft 223. (See Figs. 1 and 7.)

Figure 9:
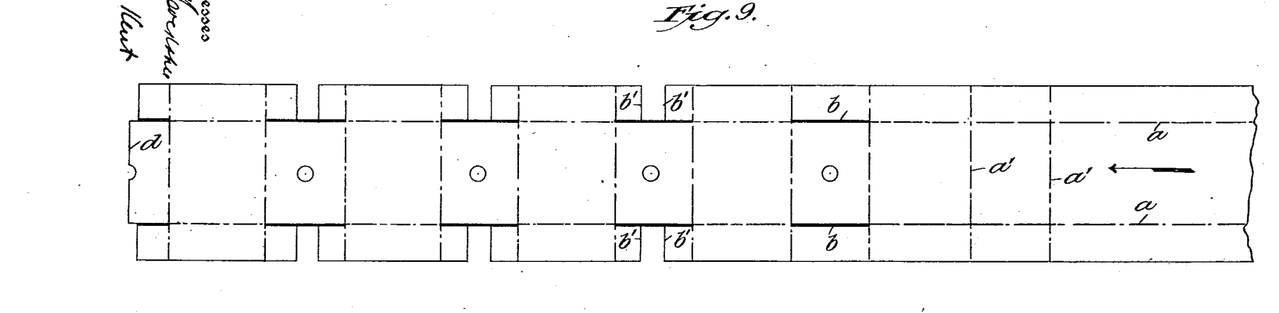
Fig. 9 is a plan view of the web of material showing its condition as it is operated upon by the different mechanisms.

The operation of the cutoff mechanism will be obvious from the description and the drawings. The cams 220 will operate the knife carrier through the medium of the arms 217, the carrier being moved back by means of the springs 212. The cutoff mechanism as a whole may be adjusted longitudinally of the machine for boxes of different sizes. This cutoff mechanism is arranged to cut off the web on the line $d$ Fig. 9. When the arms 217 are in their highest position, the lower faces of the arms are horizontal, and therefore the base and knife carrier may be adjusted longitudinally of the machine without altering the relation of the knife and die.

Figure 1:
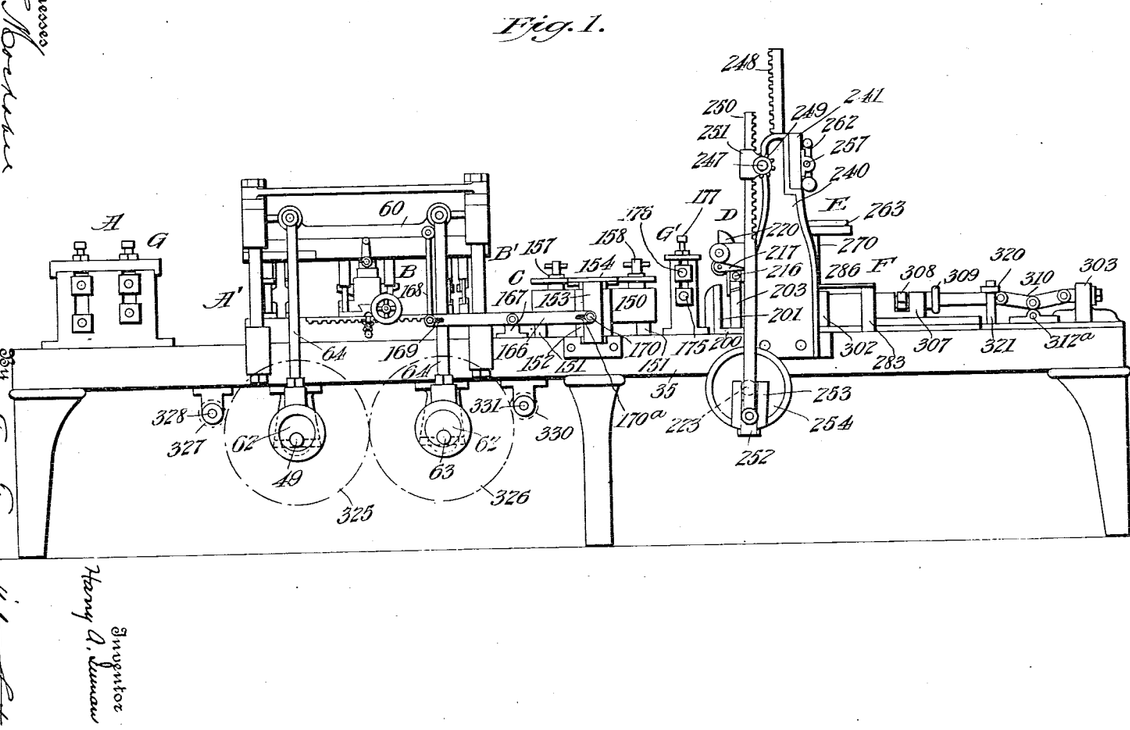
Figure 1 is a side elevation of the machine.
Figure 2:
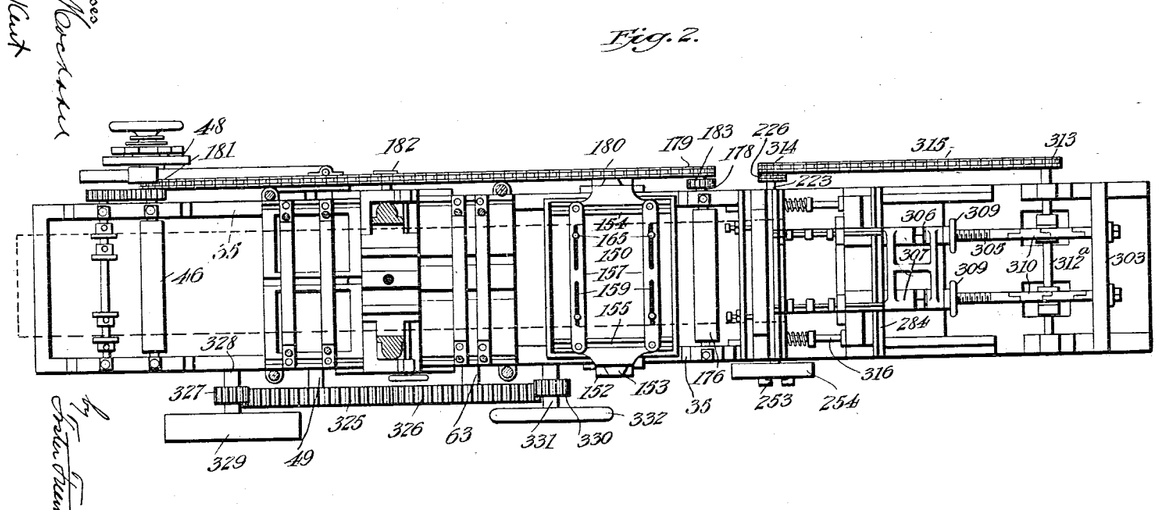
Fig. 2 is a plan view in which some of the parts which are located above the paper line have been omitted.
Figures 5, 8:
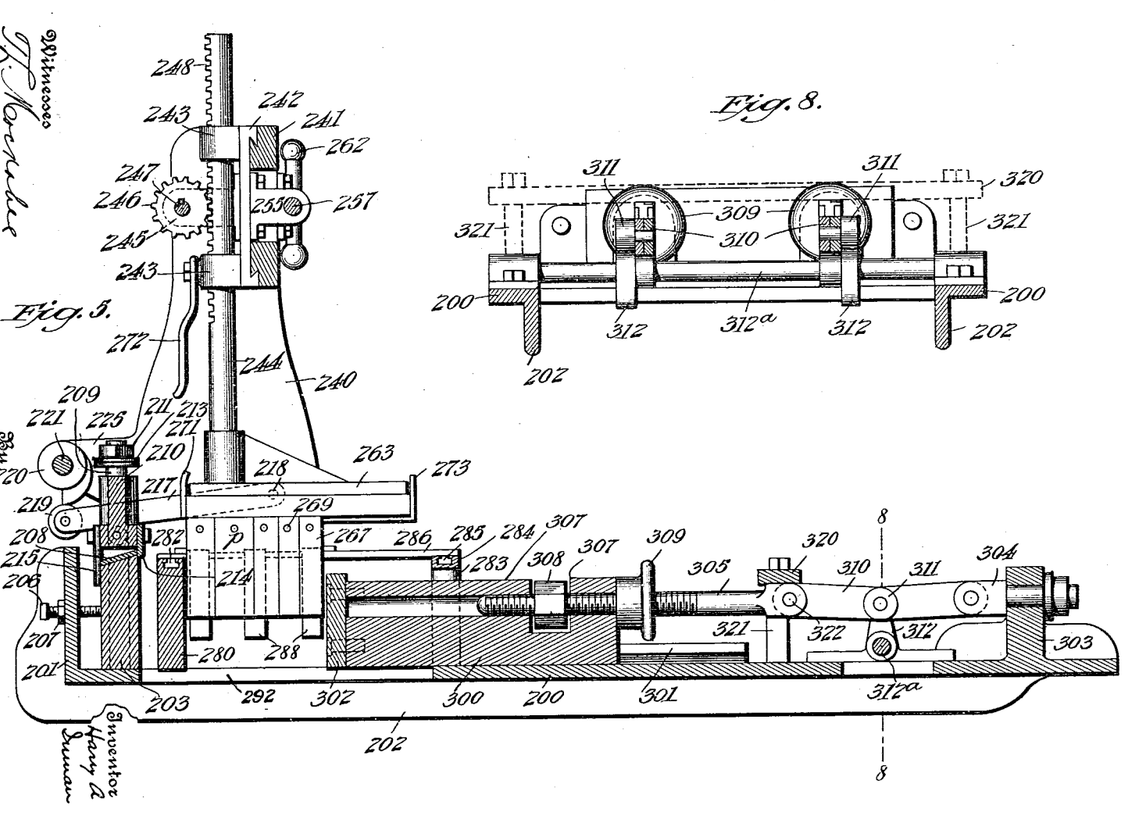
Fig. 5 is a section along the longitudinal center line of the machine, showing the cutoff, forming and presser mechanisms.
Fig. 8 is a section on the line 8—8 Fig. 5.
Figure 6:
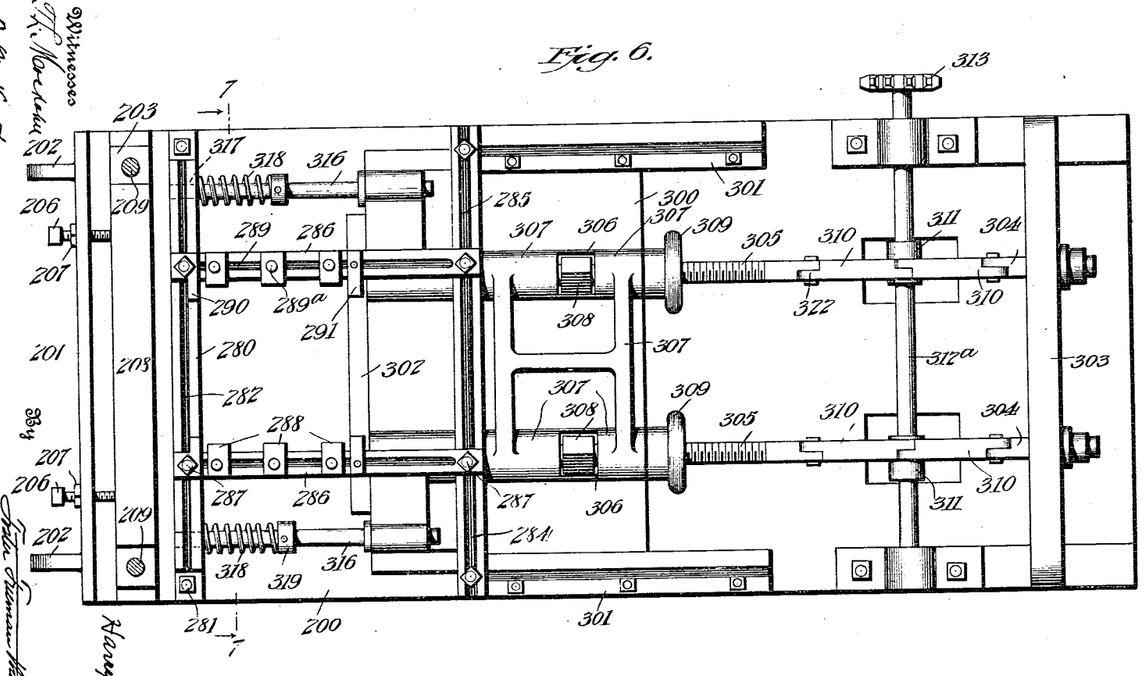
Fig. 6 is a plan view of the mechanism shown in Fig. 5, the parts above the paper line being omitted.
Figure 7:
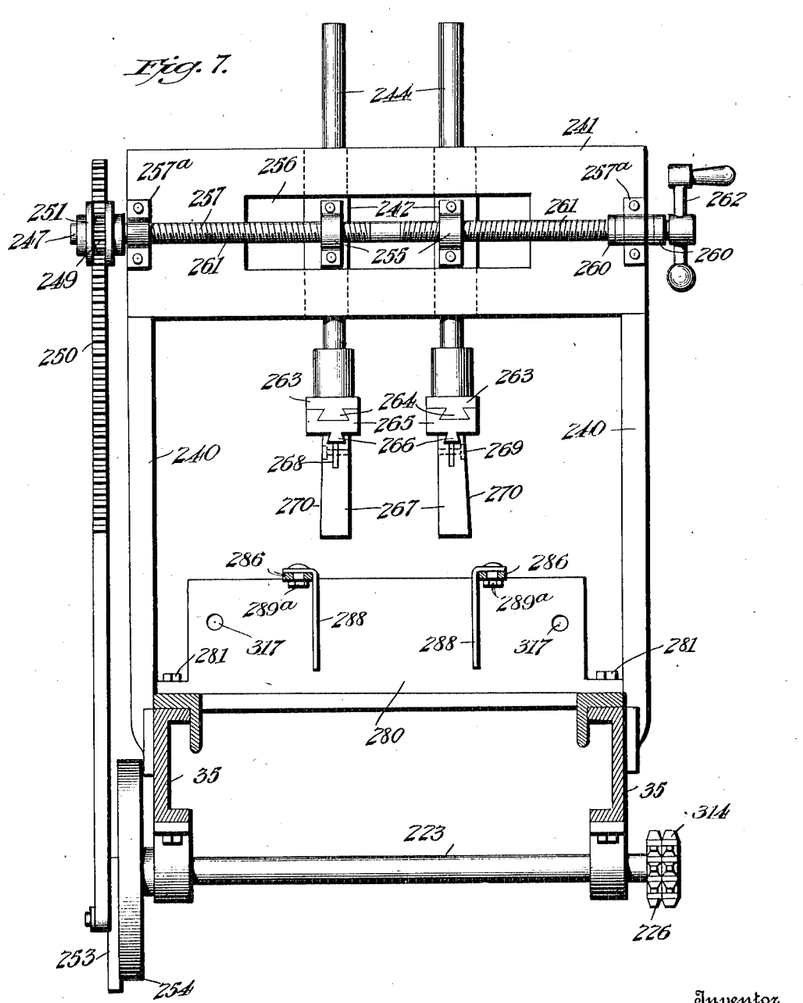
Fig. 7 is a section view on the line 7—7 Fig. 6, parts of the mechanism being shown in elevation.

*The forming mechanism.*—A pair of side members 240 are bolted to the frame side members 35 and are braced and connected at their upper ends by means of a cross member 241. This cross member is provided with a slideway, as shown in Fig. 5, and a pair of slides 242 are mounted upon this slideway so that they may be adjusted crosswise of the machine. Each of these slideways has mounted upon it a pair of spaced bearing lugs 243 which form bearings for a vertical shaft or shank 244. Each of the slides is further provided with a pair of spaced bearing lugs 245, between which is mounted a gear 246. This gear is splined upon a shaft 247 mounted for rotation in the side members 240. The shank or bar 244 has formed thereon a rack 248 which meshes with the gear 246. The shaft 247 has rigidly secured to it a pinion 249 which meshes with rack teeth upon a rod or bar 250. This bar is guided by means of a guide member 251, which has spaced ears which embrace the pinion 249 and which is pivotally mounted on shaft 247, as shown in Figs. 1 and 7. The rod or bar is pivotally connected at its lower end to a slide 252 adjustably mounted in a slideway 253 upon a disk 254 which is rigidly secured to the shaft 223. By means of the above described train of mechanism the shaft 223 imparts a reciprocating movement to the shanks 244. The driving mechanism 249 to 254 inclusive may be duplicated on the opposite side of the machine if desirable.

Each of the slides 242 has secured to it a bearing member 255, which extends through an aperture 256 in the cross member 241. A shaft 257 is mounted in bearings 257ª on the cross member and is restrained against endwise movement by means of collars 260. This shaft has right and left screw portions 261 which have threaded engagement with the bearing lugs 255. The shaft 257 is further provided with an operating handle 262 whereby the shaft may be rotated. By means of the above described construction the slides 242 may be simultaneously and uniformly adjusted crosswise of and toward and from the center of the machine. The splined connection between the shaft 247 and the gears 246 permit this movement of the slides without affecting the operative driving connection.

Each of the shanks 244 has secured thereto a head or carrier 263 which, as shown in Fig. 7, is provided with a dovetailed slideway 264. A slide 265 is mounted upon this slideway so as to have a slight movement thereon longitudinally of the machine. The slide 265 has a dovetailed slideway 266 which is arranged to receive one or more detachable and interchangeable blocks 267. The upper portions of these blocks have longitudinal slits 268 and the blocks may be clamped to the slide by means of screws 269. The outside faces 270 of the blocks are tapered, as shown in Fig. 7, for a purpose hereinafter to be described. The rear ends of the slides 265 have cam fingers 271 secured thereto, which coöperate with cam fingers 272 secured to the bearing lugs 243 on the frame of the machine. The rearward movement of the slides is limited by upwardly extending plates 273. These plates are omitted from Fig. 7 so as to show the other mechanism.

A rigid abutment 280 extends transversely of the machine and is mounted upon and secured to the bed 200 by means of bolts 281. This abutment is therefore, located in a fixed position longitudinally of the frame. The upper face of this abutment has formed therein a T-shaped groove or slideway 282. Posts 283 are mounted on opposite sides of the machine and support a cross bar 284, which has formed therein a T-shaped groove or slideway 285 extending transversely of the machine and parallel to the slideway 282. A pair of side bars or members 286 span the rigid abutment and the cross bar 284, and are adjustably connected to this abutment and cross bar by means of bolts 287. By means of this construction the side bars 286 may be adjusted transversely of the machine. A plurality of yielding spring fingers 288 are mounted upon the side bars 286, the side bars being provided with slots 289 and clamping bolts 289ª extending through the spring fingers so that they may be clamped in adjustable position on the side bars. A pair of fingers 290 are secured in fixed position by means of bolts 287, and a second pair of fingers 291 are mounted upon the side bars 286 and arranged to be adjusted longitudinally thereon in the same manner as the spring fingers 288.

The mechanism thus described forms a die which coöperates with the plunger mechanism to form the box. The die may be adjusted to boxes of different widths by adjusting the side bars 286 transversely of the machine and for different lengths by adjusting the spring fingers 288 and the fingers 291 longitudinally of the machine. The plunger mechanism may be adjusted to boxes of different widths by adjusting the slides and plunger carriers toward and from each other transversely of the machine through the medium of the handle 262. The depth of the plunger may be adjusted for boxes of different lengths by adding or subtracting blocks 267. By proper combinations of blocks the plunger may be built up to suit any size box with a small number of blocks. The stroke of the plunger may be varied by adjusting the position of the slide 252 in the slideway 253.

*The presser mechanism.*—A carriage 300 is guided on the bed 200 by means of the guide members 301. This carriage has secured to it a face plate 302. A bearing member 303 is formed on the rear portion of the bed 200 and has secured to it lugs 304. Threaded shanks 305 extend through holes formed in bearings 307 of the carriage so that the shanks 305 can slide in said holes. The bearings are cut away as shown at 306 so as to provide space for adjusting nuts 308. Clamping nuts 309 are also mounted upon shanks 305. The shanks 305 are connected to the bearing lugs 304 by means of toggle links 310. These toggle links have mounted thereon cam rolls 311 which engage cams 312 upon a shaft 312$^a$ extending transversely of the machine, (see Fig. 8). This shaft has mounted upon it a sprocket 313 which is driven from a sprocket 314 upon shaft 223 by means of a chain 315.

The carriage has secured to it bars 316 which are guided in apertures 317 in the abutment 280, and coöperating holes may be formed in the base 203 of the cutoff mechanism. The bars have mounted thereon springs 318, which engage at one end the rigid abutment 280 and at the other end adjustable collars 319. A cross member 320 is supported from the bed 200 by means of posts 321 and the lower face of the cross member 320 engages the joints 322 between the toggle links 310 and the threaded shanks 305 so as to take up the upward thrust.

The carriage 300 is reciprocated in one direction by means of the cam 312 and in the opposite direction by means of the springs 318. In Fig. 1 the presser carriage 300 is shown in its rearward position, while in Fig. 5 it is shown in its forward position. It is of course necessary that the toggles be still slightly broken when in the position shown in Fig. 5, so that the springs 318 may throw them to the position shown in Fig. 1. The position of the presser carriage 300 longitudinally of the machine may be adjusted by means of the adjusting nuts 308 so as to adjust the presser for boxes of different sizes, and the carriage may be clamped in adjusted position by means of the lock nuts 309.

The operation of the forming and pressing mechanisms will now be described. As the web is fed underneath the plungers these plungers come down and the web is clamped between the plungers and the die. While in this clamped position the cutoff mechanism becomes operative to cut off the web on the line $d$ Fig. 9. If desired the plungers may be driven by mechanism shown and described in the patent to Horace Inman, #996,086, granted June 27, 1911. After the web has been cut off on the line $d$ the plungers move downwardly and the box is formed, the side flaps being engaged by the spring fingers 288 and the end flaps by the fingers 290, 291, and the rigid abutment 280. The fingers 290 and 291 will engage the corner flaps and will insure that these corner flaps are folded inwardly and inside of the end flaps 32. As the plunger continues to move downwardly the presser carriage 300 will move forwardly and the forward end flap will be engaged by the face plate 302. It will be noted that when the plungers start to move downwardly the carriages 265 have been moved forwardly by the cams 272 during the previous upward movements of the plungers, so that the fingers 271 will be in engagement with the carriage 263. During the downward movement of the plungers the presser carriage 300 will move forwardly moving the blocks 267 and their carriages 265 with it, since there is a loose connection between the carriages 263 and the slides 265. When the plunger has arrived at its lowest position the box and the plunger blocks will then be pressed against the rigid abutment 280. This insures that the box will be pressed together. When the plunger moves upwardly the box is retained between the spring fingers 288, the rigid abutment and the face plate 302. If desired spring fingers similar to those shown in the application referred to may be provided to prevent the box from moving upwardly with the plungers. When the next box is formed the formed box will be pushed downwardly through the opening 292 in the bed.

It will be noted that the outside faces 270 of the plungers are beveled. The function of this construction is to insure that the sides of the box will be square or at right angles to the bottom 30. If the sides of the plungers are at right angles to the bottom line, then it is impossible to press the upper portions of the sides tight enough against the plungers so that the box will be square. However, by properly beveling these sides even the yielding spring fingers will cause the box sides to be properly squared with respect to the box bottom.

It will be noted that the right and left screw 257 permits of a uniform movement of the plungers toward and from the center line of the machine. This is convenient since all mechanisms can be adjusted with respect to a longitudinal center line. In the specific construction shown the built up block arrangement of the plunger mechanism is shown as applied to a laterally expansible plunger comprising two plunger members. It is obvious, however, that these blocks 267 may extend entirely across the machine, so that there will be in effect a single plunger member.

The shafts 49 and 63 have mounted thereon intermeshing gears 325 and 326, the gear 325 meshing with a gear 327 upon a shaft 328. This shaft 328 forms the main driving shaft of the machine and has mounted upon it a main driving pulley 329, which may be clutched to or unclutched from the shaft 328 by means of a clutch of well known construction. A gear 330 meshing with a gear 326 is mounted upon a stub shaft 331 and has mounted upon it a hand wheel 332, so that the machine may be turned over by hand.

*Operation of the machine.*—The web of material is fed through the machine by means of the feeding mechanisms G and G'. The material is scored longitudinally on the lines $a$ by means of the longitudinal scoring mechanism A, and is simultaneously trimmed. The cross scores $a''$ are formed on the web by means of the cross scoring mechanism A'. The material is now fed to position underneath the slitting mechanism B which forms the slits $b$. The web is now fed underneath the cross punching mechanism B' which punches out pieces from the flaps along the lines $b'$ during the succeeding downward movement of the operating head. The web is now fed to the pasting mechanism C where the flaps are pasted. The web is then fed underneath the plungers. These plungers move down and engage the web so as to clamp the same while the cutoff mechanism cuts off the web on the line $d$. The plungers descend and in coöperation with the die and presser form and press the box. It will thus be seen that the mechanisms operate successively upon the material in the order named. The elements of the different mechanisms are adjustable to boxes of different sizes. The different mechanisms may be adjusted to boxes of different widths, lengths and heights. In no case is it necessary to substitute different dies, but the elements of the mechanisms themselves are adjustable. This is also true of the plunger mechanism in which the plungers are made up of combinations of different blocks. In no case is it necessary to keep different size plungers on hand, but a combination made up of a very few blocks properly proportioned will be sufficient for a very large number of sizes. In addition it is not necessary that the depth of the plunger be entirely built up, since it is only necessary to use the end blocks, for instance, in Fig. 5, these end blocks are designated $p$. By omitting the blocks between these end blocks these end blocks $p$ may be adjusted toward and from each other to vary the depth of the plunger.

In order to adjust the pasting and forming mechanisms to boxes of different sizes the material is fed forward one or two steps from the scoring and dieing mechanisms which have been previously adjusted in the manner described in my application 568,740, and the pasting members of the pasting mechanism C are adjusted longitudinally and crosswise of the machine so that they will come into proper engagement with the corner flaps 33. The material is now fed forward one or more steps until the box blank is underneath the forming mechanism E, with the forward cross score line $a'$ in alinement with the forward edge of the abutment 280. The cutoff mechanism D is now adjusted so as to cut off the material on the line $d$ which is located midway between the cross score lines $a'$. The cross bars 286 are now adjusted crosswise of the machine so as to place the fingers 288 in proper alinement with the longitudinal scoring lines $a$. The fingers 288 and 291 are now adjusted longitudinally of the machine so that the rear edges of the fingers 291 will be on a line with the rear cross score lines $a'$. The plungers are now adjusted crosswise of the machine by means of the handle 262 until the faces 270 are located on the lines $a$. The plungers are then built up so as to be of a depth equal to the length of the box as measured between lines $a'$. The presser mechanism F is now adjusted to proper position by means of adjusting nuts 306 and locked in position by means of lock nuts 309. The machine is now ready for operation.

In the specification and claims the terms "width," "length," and "height" are used. These terms are relative terms, and are used for convenience to designate the different dimensions of the box. In the specific construction shown the width may be taken as the dimension crosswise of the machine, and the length as longitudinally of the machine.

It is obvious that some of the features of this machine may be applied to machines which complete the blank, while other features may be applied to machines which form the blank into a box. Furthermore, certain adjustments may be used independently of others, and certain specific mechanisms may be used independently of other specific mechanisms.

It is further obvious that various changes may be made in the details of construction without departing from this invention, and it is, therefore, to be understood that this invention is not limited to the specific construction shown and described.

Having thus described the invention, what is claimed is:

1. In a box machine, the combination with means for supporting the material, of a forming plunger arranged to operate on said material, said plunger comprising a body portion having a guideway, and a series of removable blocks supported by said guideway and adjustable therealong.

2. In a box machine, the combination with means for supporting the material, of a forming plunger arranged to operate on said material, said plunger comprising a body portion having a guideway, and a block arranged to be adjustably clamped on said guideway.

3. In a box machine, the combination with means for supporting the material, of a forming plunger arranged to operate on said material, a reciprocating plunger carrier, a connection between said plunger and carrier permitting one to move relatively to the other, and a presser arranged to coöperate with said plunger.

4. In a box machine, the combination with means for supporting the material, of a forming plunger arranged to operate on said material, a reciprocating plunger carrier, a slidable connection between said plunger and carrier, and a presser arranged to coöperate with said plunger.

5. In a box machine, the combination with means for supporting the material, of a forming plunger arranged to operate on said material, a coöperating die including an abutment, a plunger carrier, a loose connection between said plunger and carrier, a cam for moving the plunger away from said abutment, and a presser coöperating with said plunger.

6. In a box machine, the combination with means for supporting the material, of a forming plunger arranged to operate on said material, a coöperating die including an abutment, a plunger carrier, a sliding connection between said plunger and carrier, a cam for moving the plunger away from said abutment, and a presser coöperating with said plunger.

7. In a box machine, the combination with means for supporting the material, of a forming plunger arranged to operate on said material, a coöperating die including an abutment, a plunger carrier, a loose connection between said plunger and carrier, means for reciprocating said plunger carrier, a cam on the machine frame in the path of movement of said plunger for moving the plunger away from said abutment, and a presser coöperating with said plunger.

8. In a box machine, the combination with means for supporting the material, of a forming plunger arranged to operate on said material, a reciprocating plunger carrier, said plunger including a support having a loose connection with said carrier, a series of blocks arranged to be adjustably clamped on said support, and a presser arranged to coöperate with said plunger.

9. In a box machine, the combination with means for supporting the material, of a forming plunger arranged to operate on said material, a reciprocating plunger carrier, said plunger including a support having a loose connection with said carrier, and a series of blocks arranged to be adjustably clamped on said support, a presser arranged to coöperate with said plunger, and means for adjusting the position of said presser.

10. In a box machine, the combination with means for supporting the material, of a forming plunger arranged to operate on said material, a rigid abutment, a presser arranged to coöperate with said plunger, means for adjusting the depth of said plunger, and means for adjusting the position of said presser relatively to said abutment.

11. In a box machine, the combination with means for supporting the material, of a forming plunger arranged to operate on said material, a die coöperating with said plunger and comprising adjustable side members, yielding fingers carried by said side members and projecting in the line of movement of said plunger, and means for adjusting the size of the plunger.

12. In a box machine, the combination with means for supporting the material, of a forming plunger arranged to operate on said material, a die coöperating with said plunger and comprising adjustable side members, yielding members carried by said side members and adjustable thereon, and means for adjusting the size of the plunger.

13. In a box machine, the combination with means for supporting the material, of a forming plunger arranged to operate on said material, spaced supporting members, a pair of side members adjustably supported thereon, yielding plunger engaging members adjustably supported by said side members, said members forming a coöperating die, and means for adjusting the size of the plunger.

14. In a box machine, the combination with means for supporting the material, of a forming plunger arranged to operate on said material, a rigid abutment, a supporting member spaced therefrom, side members adjustably supported by said member and abutment, said members forming a die, and a presser arranged to move underneath said supporting member and coöperate with said plunger.

15. In a box machine, the combination with means for supporting the material, of a forming plunger arranged to operate on said material, a rigid abutment, posts spaced from said abutment, a supporting member bridging said posts, side members adjustably supported by said members, said members forming a coöperating die, and a presser arranged to move underneath said supporting member and coöperate with said plunger.

16. In a box machine, the combination with means for supporting the material, of a forming plunger arranged to operate on said material, a rigid abutment, a supporting member spaced therefrom, side members adjustably supported by said members, said members forming a coöperating die, a presser arranged to move underneath said supporting member and coöperate with said plunger, means for adjusting the size of said plunger, and means for adjusting the position of said presser.

17. In a box machine, the combination with means for supporting the material, of forming mechanism arranged to operate on said material, said forming mechanism including a pair of spaced plungers, carriers for said plungers, a guideway, and slides on said guideway supporting said carriers.

18. In a box machine, the combination with means for supporting the material, of forming mechanism arranged to operate on said material, said forming mechanism including a pair of spaced plungers, carriers for said plungers, a guideway, slides on said guideway supporting said carriers, and a right and left screw for moving said slides.

19. In a box machine, the combination with means for supporting the material, of forming mechanism arranged to operate on said material, said forming mechanism including a pair of spaced plungers, carriers for said plungers, a guideway, slides on said guideway supporting said carriers, racks on said carriers, and gears for operating said racks.

20. In a box machine, the combination with means for supporting the material, of forming mechanism arranged to operate on said material said forming mechanism including a pair of spaced plungers, carriers for said plungers, a guideway, slides on said guideway supporting said carriers, racks on said carriers, gears for operating said racks, and a right and left screw for moving said slides.

21. In a box machine, the combination with means for supporting the material, of a forming plunger arranged to operate on said material, and a die coöperating with said plunger and including downwardly extending spring fingers, said plunger having its faces engaging said fingers beveled, for the purpose set forth.

22. In a box machine, the combination with means for supporting the material, of forming mechanism arranged to operate on said material, said forming mechanism including a pair of spaced plungers, and a die coöperating with said plungers and including yielding members, the outside faces of said plunger engaging said yielding members being beveled, for the purpose set forth.

23. In a box machine, the combination with means for supporting the material, of forming mechanism arranged to operate on said material, said forming mechanism including a pair of spaced plungers, a die coöperating with said plungers and including yielding members, the outside faces of said plungers engaging said yielding members being beveled, means for adjusting said yielding members, and means for adjusting said plungers toward and away from each other, for the purpose set forth.

24. In a box machine, the combination of a paste receptacle, means for passing the material to be pasted over said receptacle, a vertically movable member arranged at one side of the receptacle, a bar secured to said member and extending over said receptacle in a direction transverse of the line of movement of the material, means for adjusting said bar parallel with the line of movement of the material, a bracket secured to the under side of said bar, pasting members carried by said bracket beneath the material, and means for adjusting said bracket longitudinally of the bar.

25. In a box machine, the combination of a paste receptacle, means for moving the material to be pasted over said receptacle, a vertically movable member at one side of the receptacle, a bar carried by said member and adjustable thereon parallel with the line of movement of the material, said bar being arranged above the material and extending transversely of the line of movement thereof, a bracket secured to said bar and adjustable longitudinally thereof, and pasting members carried by said bracket beneath the material.

26. In a box machine, the combination of a paste receptacle, means for moving the material to be pasted over said receptacle, vertically movable members arranged on opposite sides of the receptacle, a plurality of bars carried by said members and adjustable thereon parallel with the line of movement of the material, brackets carried by said bars and adjustable transversely of the line of movement of the material, and pasting members carried by said bracket and adapted to contact with the lower side of the material.

27. In a box machine, the combination of a paste receptacle, means for moving the material to be pasted over said receptacle, vertically movable members arranged on opposite sides of said receptacle, bars secured to said members and arranged above the material to be pasted, means whereby said bars may be adjusted parallel with the line of movement of the material, brackets carried by each of said bars on the under side thereof and adjustable transversely of the line of movement of the material, and pasting members carried by said brackets beneath the material.

In testimony whereof I affix my signature in presence of two witnesses.

HARRY A. INMAN.

Witnesses:
MARIE B. SNYDER,
ELLEN V. SHEEHY.